No. 651,833. Patented June 19, 1900.
C. L. DEUTSCH.
APPARATUS FOR FILTERING WATER.
(Application filed July 19, 1898.)
(No Model.) 2 Sheets—Sheet 1.
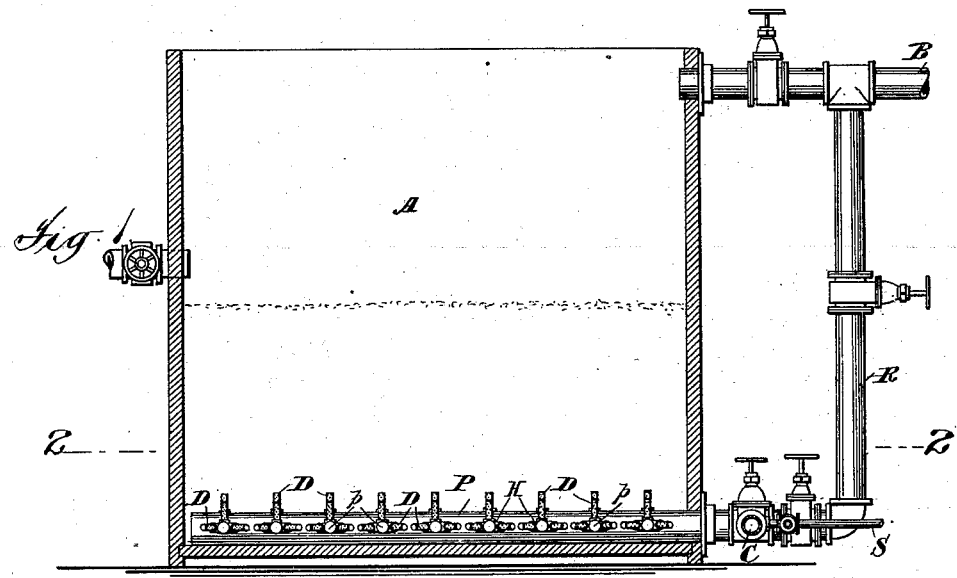
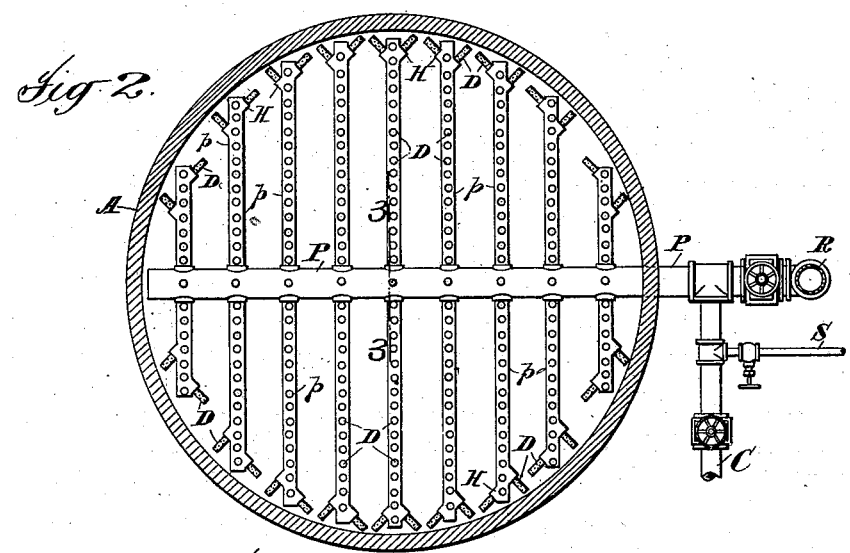
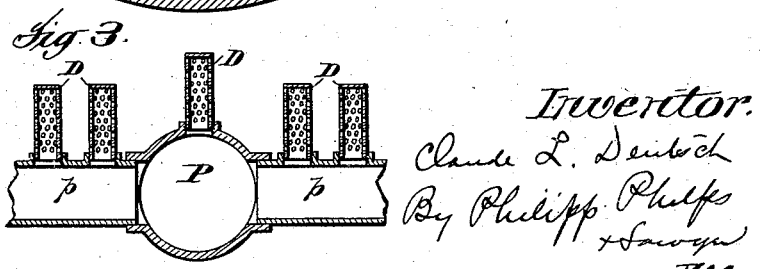
Attest:
T. F. Kehoe.
Gn. Borst
Inventor.
Claude L. Deutsch
By Philipp Phelps
+ Sawyer
Attys
THE NORRIS PETERS CO., PHOTO-LITHO., WASHINGTON, D. C.

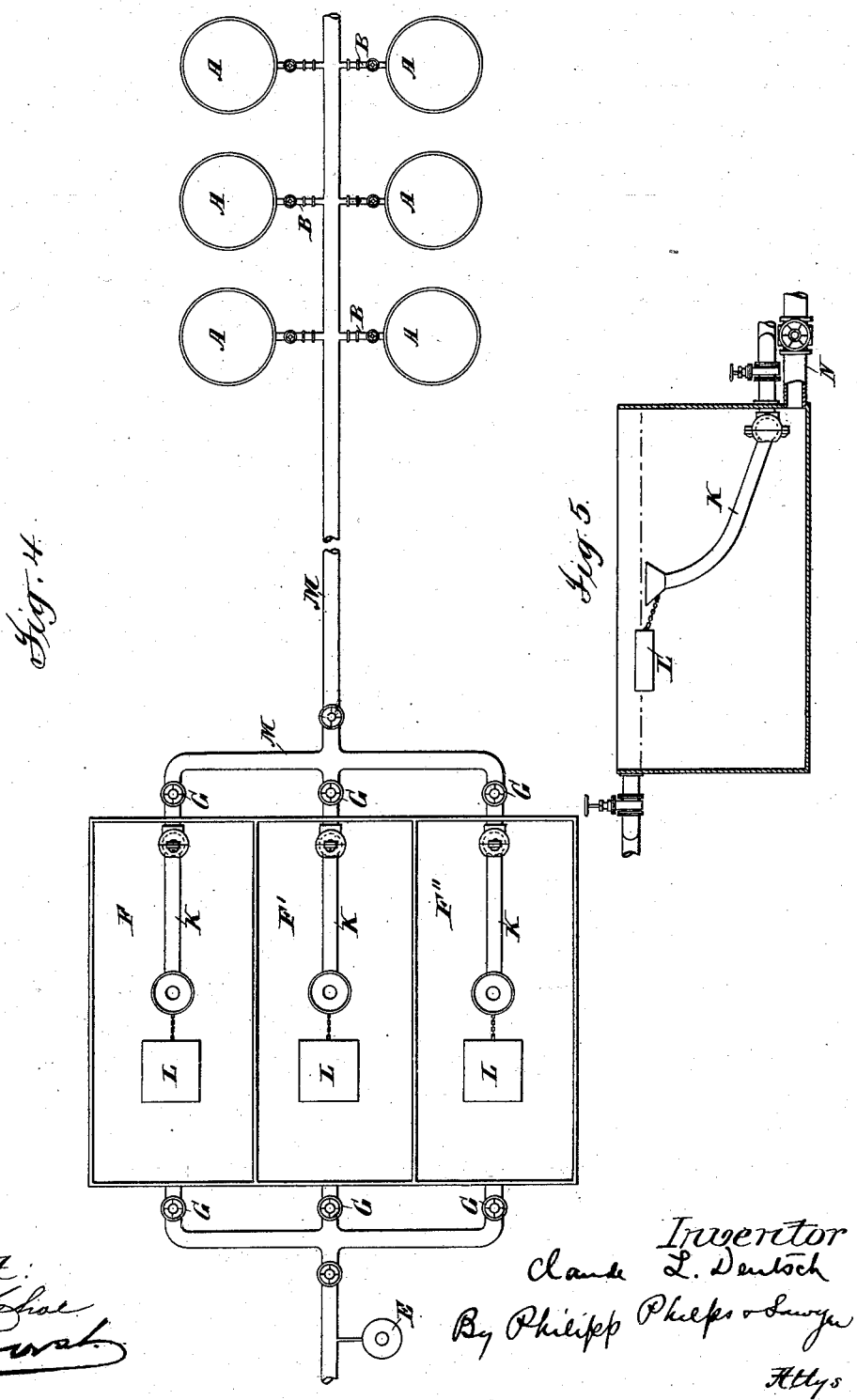

UNITED STATES PATENT OFFICE.

CLAUDE L. DEUTSCH, OF ELIZABETH, NEW JERSEY, ASSIGNOR TO W. M. DEUTSCH, OF SAME PLACE.

APPARATUS FOR FILTERING WATER.

SPECIFICATION forming part of Letters Patent No. 651,833, dated June 19, 1900.

Application filed July 19, 1898. Serial No. 686,324. (No model.)

*To all whom it may concern:*

Be it known that I, CLAUDE L. DEUTSCH, a citizen of the United States, residing at Elizabeth, county of Union, and State of New Jersey, have invented certain new and useful Improvements in Apparatus for Clarifying Water, fully described and represented in the following specification and the accompanying drawings, forming a part of the same.

In the filtration of water with the use of a coagulant it is found that if the coagulant be introduced into the stream of water flowing to the filter and the coagulant, with all the impurities in the water, is caught on the filter-bed the filter becomes rapidly clogged and requires frequent washing, entailing a considerable expense, because of the necessity of using in the washing operation filtered water.

It has been proposed heretofore to reduce the amount of coagulant required by the use of settling-basins made a part of the filter-tank itself. This has been found undesirable because, among other reasons, of the limited space available for the purpose, and I now propose to provide filtering apparatus with settling-basins placed between the point of introducing the coagulant into the water and the filter-chamber and separate from and independent of the latter, the same consisting of a number of compartments, one or more of which may be used for settling while the water is being drawn out of the other.

My invention further relates to the sand-valves employed for preventing the passage of sand out of the filter-chamber into the filtered water. Heretofore it has been usual to make these valves with a considerable size of surface and a small opening communicating between them and the filtered-water pipe. It has been thought necessary to make this communicating opening small in order to secure a uniform flow of water throughout the area of the bottom of the filter and to prevent the water establishing a channel through a limited number of the valves. The result has been that sediment lodged in these valves during the washing operation when unfiltered water was used for washing and that, owing to the small size of the opening between the valves and the filtered-water pipe, this sediment was not readily flushed out by the filtered water that passed into the valves. It is one of the objects of my invention to overcome this difficulty by changing the formation of the valves, and I secure it by making the valve of substantially - uniform size throughout, so that it shall have a comparatively-large communicating opening with the filtered-water pipe, and by reducing the number of perforations in the valve itself, in order in this manner, instead of, as formerly, by limiting the size of the opening between the valve and the filtered-water pipe, to control the flow of the water through the valves and secure the distribution of the flow over the entire area of the filter-bottom. I find, also, that it is an advantage to place valves of this construction upon the top rather than upon the side of the filtered-water pipes, since there is greater freedom with regard to the size and location of the valves when so placed, and therefore a more perfect distribution of the water can be secured. The shape of these valves is capable of considerable variation. Thus they may be made cylindrical or rectangular or of any other polygonal shape.

In the drawings annexed, forming part of this specification, Figure 1 is a sectional view of the filter embodying my improvements. Fig. 2 is a plan view of the same. Fig. 3 is a sectional view of a portion of one of the pipes, showing the valve attached, on a large scale; and Fig. 4 is a plan view of a filtering apparatus in which my method is employed. Fig. 5 is a sectional side view of a tank.

Referring to the drawings, A is a filter-tank, B a supply-pipe, and C the exit-pipe for filtered water. C connects with the filtered-water pipe P in the bottom of the filter, which latter is provided with branch pipe $p$. These pipes $p$ are provided with perforated nipples or strainers D, which are preferably attached to the pipes by screw-threads, as shown. A preferable position for these nipples, in general, is on the upper surfaces of the pipes; but I find it advantageous to place them horizontally and in an angular position with reference to the side walls of the chamber at the ends of the pipes, as shown in the drawings, as thereby a greater flushing action upon the interior of the filter-chamber is secured, and thereby the sediment lodged upon the interior of the chamber is more readily detached. The pipes $p$ may, if desired, be provided with shoulders H for the reception of these angularly-placed nipples.

The filter may be washed by a reverse current of filtered water through C or by a reverse current of unfiltered water through the connecting-pipe R. Air for aeration is forced in at the proper time through pipe S.

Referring to Fig. 4, E is a coagulant-tank. F F' F'' are three storage-reservoirs, through any or all of which the water may be directed, by means of valves G, on its way to the filter-chamber A. These tanks are used for settling intermittently, one or more of them being used for sedimentation while the water is being drawn from the third to the filters. The coagulant used may be alum or any other suitable coagulant.

In Fig. 5 is shown a hinged section K, attached to the exit-pipe M by a ball-and-socket or other flexible joint. This section is attached to a float L, by which its mouth is kept near the surface of the water, and thus the exit of sediment with the settled water is prevented. After the clear water has been drawn off the sediment is removed through the drain-pipe N.

What I claim is—

1. In an apparatus for clarifying water, the combination of a water-supply pipe, a coagulant-tank, a filter, and two or more sedimenting-basins separate from and independent of the filter-tank and placed between the filter-tank and the point where the coagulant is introduced into the stream of water so as to receive the water after it has been charged with coagulant and discharge the same after it has been sedimented to the filter, and means whereby the water may be directed into and taken from one or the other sedimenting-basin at will, substantially as described.

2. In a filter, a filtered-water pipe provided with sand-valves made of vertical perforated tubes of substantially-uniform size throughout and in which the opening between the tube and the filtered-water pipe is of substantially the same size as the tube itself and in which the perforations opening from the tube to the bed are of such a number as to properly limit the flow of water through the valve, substantially as described.

3. The combination of a filter-chamber, a supply-pipe, a filtered-water pipe, vertical perforated nipples of substantially-uniform size throughout their length, and means for attaching the nipples to the supply-pipe, substantially as described.

4. The combination of a filter-chamber, as A, a supply-pipe, as B, filtered-water pipe, as P, provided with branch pipes, as $p$, and vertical perforated nipples of substantially the same length and of substantially-uniform size throughout their length made separate from the pipes $p$ and adapted to be secured thereto, as D, substantially as described.

5. In a filter, the combination of a filtered-water pipe, as P, and the branch pipes, as $p$ provided at their ends with perforated nipples inclined to the branch pipes and angularly placed with reference to the side walls of the filter-chamber, whereby the scouring action of the wash-water is promoted, substantially as described.

6. The combination in a filter, of a filtered-water pipe, as P, provided with a branch pipe, as $p$, having a shoulder, as H, and a nipple angularly placed with reference to the filter-wall and fitted into the shoulder, substantially as described.

7. The combination in a filter-chamber, of a filtered-water pipe, as P, provided with branch pipes, as $p$, perforated nipples set into the tops of the branch pipes and perforated nipples set at the ends of the branch pipes and on their sides and angularly placed with reference to the filter-chamber wall, substantially as described.

In testimony whereof I have hereunto set my hand in the presence of two subscribing witnesses.

CLAUDE L. DEUTSCH.

Witnesses:
T. F. KEHOE,
NELLIE MAGUIRE.